(No Model.) 3 Sheets—Sheet 1.

G. C. AVERY.
MACHINE FOR BENDING WOOD.

No. 248,267. Patented Oct. 18, 1881.

Attest:
Geo. H. Graham
Jacob Felbel

Inventor,
Geo. C. Avery
By J. N. McIntire
Atty.

(No Model.) 3 Sheets—Sheet 2.

G. C. AVERY.
MACHINE FOR BENDING WOOD.

No. 248,267. Patented Oct. 18, 1881.

Attest,
Geo. M. Graham
Jacob Felbel.

Inventor,
Geo. C. Avery
By
J. N. McIntire
Att'y.

(No Model.) 3 Sheets—Sheet 3.

G. C. AVERY.
MACHINE FOR BENDING WOOD.

No. 248,267. Patented Oct. 18, 1881.

Attest:
Jacob Felbel.
R. H. Devoe.

Inventor,
Geo. C. Avery
By
J. N. McIntire
Att'y.

UNITED STATES PATENT OFFICE.

GEORGE C. AVERY, OF LOUISVILLE, KENTUCKY.

MACHINE FOR BENDING WOOD.

SPECIFICATION forming part of Letters Patent No. 248,267, dated October 18, 1881.

Application filed July 26, 1881. (No model.)

*To all whom it may concern:*

Be it known that I, GEORGE C. AVERY, of Louisville, in the county of Jefferson and State of Kentucky, have invented certain new and useful Improvements in Machinery for Bending Wood; and I do hereby declare that the following is a full and exact description thereof, reference being had to the accompanying drawings, making a part of this application.

My invention relates to a novel machine for bending the ends of bars or sticks, especially such as are used for plow-handles.

Previous to my invention machines have been devised and employed for this kind of work, but in all of them with which I am familiar the principles of construction and modes of operation have been such that the work could not be done perfectly with that rapidity with which it is desirable labor-saving machines should work.

It is the main object of my invention to provide for use a machine which shall possess the capacity to do with the requisite perfection a very much larger amount of work than it has been possible to accomplish with bending-machines as heretofore made; and to this main end and object my invention consists in a machine involving in its construction and mode of operation the several novel features which will be hereinafter more particularly pointed out and specifically claimed.

To enable those skilled in the art to make and use my invention, I will now proceed to more fully explain it, referring by letters to the accompanying drawings, making part of this specification, and in which I have illustrated a machine embodying the several features of my said invention as I have practically tested and successfully used them.

Figure 1:
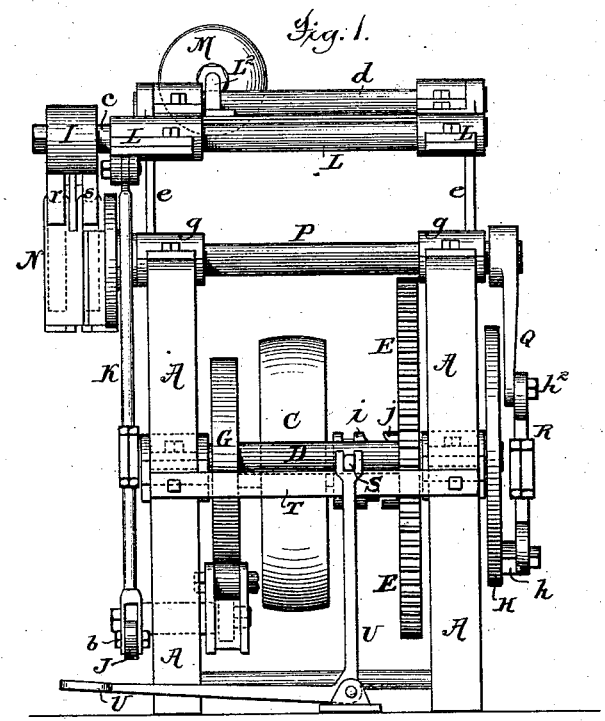
Figure 2:
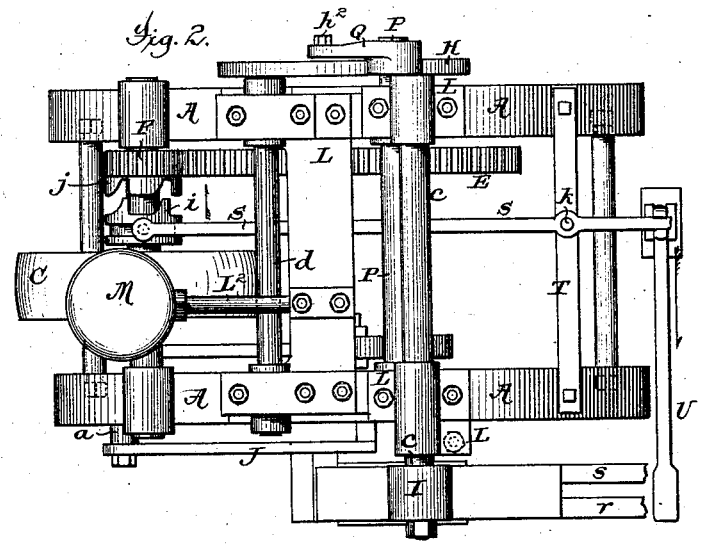
Figure 3:
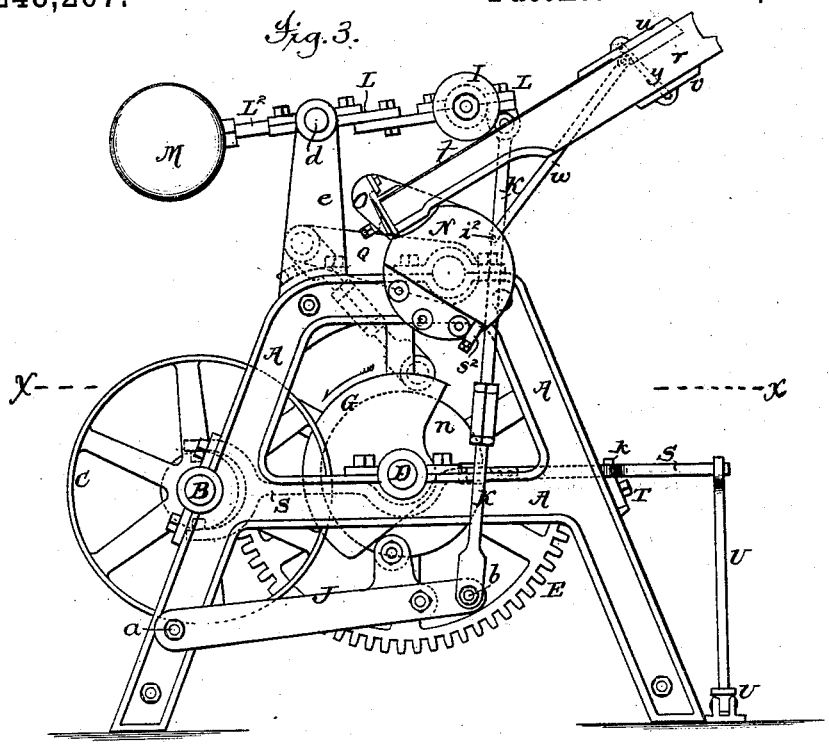
Figure 4:
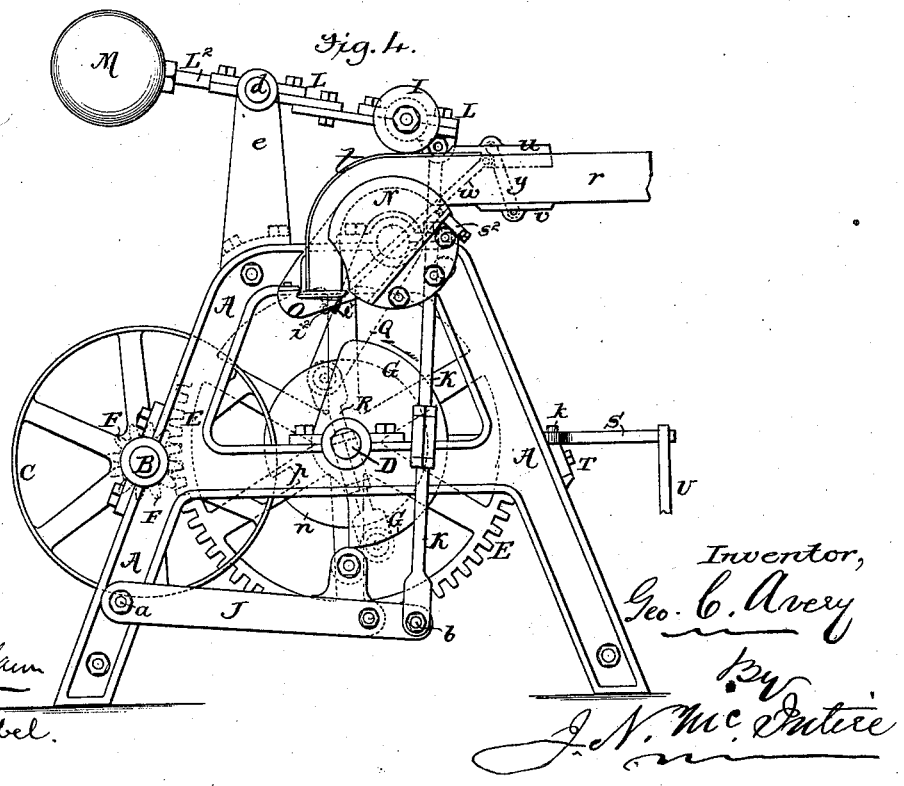
Figure 5:
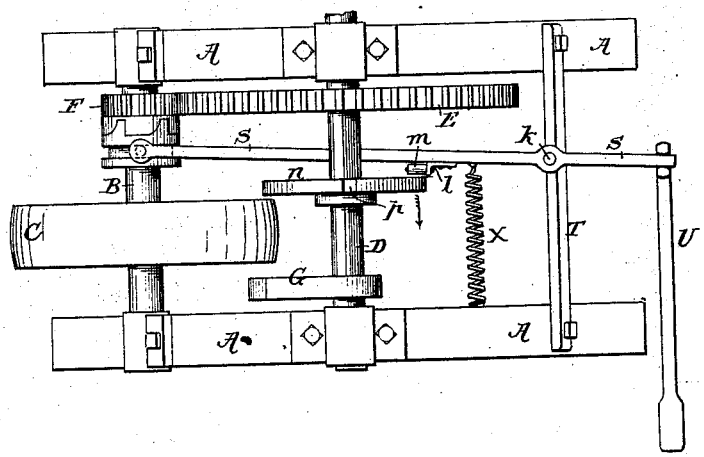
Figure 7:
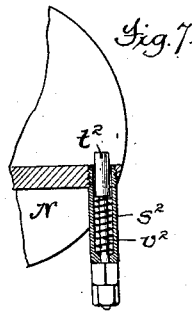
Figure 7:
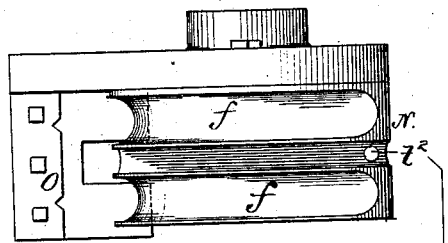
Figure 6:
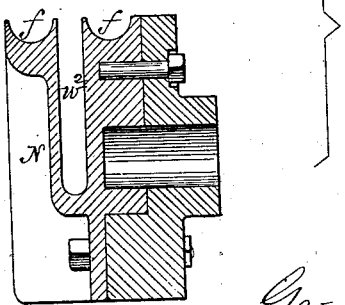

In the accompanying drawings, Figure 1 is a front elevation. Fig. 2 is a top view. Fig. 3 is a side elevation with the moving parts in one position. Fig. 4 is a similar view with the parts in another position; Fig. 5, a skeleton or partial horizontal section at the line $x\,x$ of Fig. 3, to better show the automatic clutch and shipper mechanism hereinafter described. Fig. 6 is a detail view of the spring-plunger of bending-head; and Fig. 7 shows in top view and in section the bending-head or former detached.

In the several figures the same part will be found designated by the same letter of reference.

A is the main frame-work of the machine, in which is mounted at the rear side thereof the main driving-shaft B, carrying a pulley, C, to which the power to run the machine is applied by a drive-belt.

Near the middle of the main frame A is mounted in suitable bearings the counter-shaft D, on which is keyed fast the main spur-gear E, that engages with and is driven by the spur-pinion F of the main shaft B; and on the said counter-shaft D are also secured cam-plate G, by which the holding-down roll I is kept to its work, and a face-plate, H, the wrist-pin $h$ of which operates the former mechanism, all as will be presently explained.

J is an arm or lever pivoted at $a$ to the main frame of the machine, and at $b$ to the lower end of a connecting-rod, K, that at its upper end is pivoted, as shown, to the forward part of a lever-like frame, L. This frame carries near its forward end the shaft $c$ of the presser-roller or holding-down roll I, before referred to, and is provided with a rearwardly-projecting arm, $L^2$, heavily weighted at M. The said lever-like frame L is mounted to oscillate about a shaft or axis of motion, $d$, arranged in bearings at the upper ends of the posts or stands $e$, and is alternately rocked on its said axis of motion, first in one and then another direction (to alternately raise and lower the presser-roll I) by the cam G, acting on lever J and the counter-weight M, respectively.

N is the former or oscillatory head, on which the stock to be bent is formed into shape or bended. It is a sort of circular disk-like casting formed with peripheral grooves $f\,f$ for the reception of the cut and rounded edges of the handles to be bent, and has a projecting portion, O, adapted to receive and hold the end of the spring-plate, which is clamped onto the stock previous to putting the latter into the machine to be bent. At Fig. 6 will be seen, in detail view, the shape of this former. This former N is mounted fast on one end of a shaft, P, that turns in suitable boxes at $g\,g$ on the main frame, and to the other end of which is keyed fast the larger end or butt of a crank, Q, the smaller end of which is connected by a pivotal pin, $h^2$, to one end of a pitman R, the other end of which is connected to the wrist-pin $h$ (as before mentioned) of the face-plate H.

As it is requisite that the oscillatory movements of the former N, and the motions of the other parts of the bending mechanism should be under the control of the operative as to their starting, (when he shall have properly inserted in place the stock to be bent,) and should automatically cease after the bending the stock and return of the parts of the machine to their normal positions shall have occurred, the main driving-shaft B is provided with a half-clutch, $i$, which is splined onto said shaft in a well-known manner, and the spur-pinion F is formed with a half-clutch, $j$, or the counterpart of $i$, so that by the alternate engagement and disengagement of the clutch devices $i$ and $j$ the pinion F may be caused to be either rotated with the continuously-revolving shaft B or left unaffected by the revolutions of said shaft. The clutching and unclutching of the said shaft B and driving-pinion F are effected by a mechanism and in a manner which I will now explain.

S is a horizontal lever, which is pivoted at $k$ on a pin projecting upwardly from a crossbar, T, of the frame of the machine, and having its rearmost bifurcated end arranged to operate the sliding portion $i$ of the clutch in the well-known manner shown. The forward end of this lever S is coupled to the upper forked end of an angle-lever, U, the other end of which is formed or provided with a foot-pad, V, for the workman to press upon, and which is pivoted at its angle in a stand, W, secured to the floor or base on which the machine rests.

Between the point $k$ and the back end of the lever S the latter has fastened to it one end of a pulling-spring, X, (see Fig. 5,) and a short distance in rear of the point of attachment to said lever of said spring there is fastened to said lever a stand, $l$, which carries an anti-friction roll, $m$, adapted to work against one side of a face-plate, $n$, against which it is held in frictional contact by the pulling action (on the lever S) of the spring X. The said face-plate $n$ is mounted fast on the counter-shaft D, and it has in its periphery a cut-out, $p$, of just the proper size and shape to permit the roll $m$ to pass through it (in a direction transverse to the axis of said roll and about horizontal) whenever said cut-out may, during the revolution of said face-plate, come in line with or adjacent to the side of said roller $m$.

The stocks or bars to be bent I have shown at $r$ and $s$, while $t$ represents the spring holder-plate, (with its clamping-plates $n$ $v$ and tie-rod $w$,) which is applied to the wooden bars $r$ and $s$ before they are put into the bending-machine, and which remains on them after the bending until they shall have become set or cured.

The holder-plate shown is of a novel construction, adapted to embrace two bars or sticks at once—and the former N is adapted to bend that number at once. By this form of holder contrivance I am enabled to prepare for the bending operation two sticks in very little more time than would be necessary to apply the holder device to a single stick, and the tie-rod $w$ being located between the sticks, when bent, the two pieces of wood are as easily and perfectly retained in shape for the curing or setting process of the bends as would be one.

The principle of construction of the holder contrivance, by which I am enabled to tie together the ends of the curved parts of the stick without any of that rupturing of the grain which so frequently occurs under the old-fashion mode of tying the bent-over end to the opposite end of the stick, I need not explain here, as it will be found described in another application by me, in which I have set up a claim for this method of tying the bended part of the stick.

$S^2$ is a tube secured to the head N at the locality shown, and provided with a plunger or piston, $t^2$, and spiral spring $v^2$, the arrangement of these devices together being such, as shown, that the said piston may be forced down within the tube, (against the pressure of the spring,) and will be pushed outward by the spring in a manner and for a purpose to be presently explained.

The operation of the machine may be thus explained: Supposing the parts of the machine to be in the positions and conditions illustrated at Fig. 3—i. e., with all the parts, except the main driving shaft and pulley at rest, the head N in the proper position to permit the introduction of the ends of the bars or sticks to be operated on, and the holder-roll I up out of the way—the operator takes the two sticks or bars $r$ and $s$, (which have been previously properly cut and had applied to them the holder-contrivance,) and holding them in about the position relatively to the machine, (seen at Fig. 3,) with their rear ends elevated to an angle of about thirty degrees to the horizon, he readily inserts the forward ends of the sticks and holder device into the receiving-portion O of the former N. Then, lowering the rear ends of the clamped sticks, he operates the treadle V, and sets the machine to work. By the depression of this treadle the front of lever S is moved in the direction indicated by the arrow at Fig. 2, and the opposite end is, of course, moved so as to throw the clutch device $i$ toward and into engagement with the counterpart $j$, thus bringing these parts into the relation seen at Fig. 5, and causing the pinion F to rotate with its shaft B and drive the gear E and all parts deriving motion from the latter. As all these parts move, the former N is rotated in the direction indicated by the arrow at Fig. 3, and the presser-roll I is brought down onto the top of spring holder-plate $t$, thereby effecting the holding down of the latter and the sticks $r$ and $s$, as these devices are, so to speak, wound up in the periphery of the former N, the action of the moving parts continuing until they shall have arrived at about or slightly past the positions shown at Fig. 4. During these movements of the parts the rotative action of the former N is effected by the crank Q on one end of the shaft P, which crank is vibrated in the proper direction and to the proper extent by the pitman R, driven from crank-plate H, and the presser-roll I is brought down to and held in the position seen at Fig. 4 by the pitman K pulling down the forward end of the lever-like frame or plate L, the said pitman being operated upon by the vibratory arm J, which, in turn, is moved on its axis of motion at $a$ by the action of the cam G, all as clearly illustrated by the drawings. As the moving parts are about arriving at the positions seen at Fig. 4, the tie-rod $w$ of the holder contrivance (which rod was inserted downward in the central slot, $w^2$, see Fig. 6, of the former N by the operator when putting the work into the machine) is forced downward against the upper end of the piston $t^2$, forcing the latter down within its tube $s^2$, and then, as the bending is completed and the projecting pins $i^2$ of the tie-rod can get back of the projecting lugs $e^2$ of the former, the said spring-piston $t^2$ operates to suddenly lift slightly the lower end of the tie-rod $w$, (vibrating it on its pivotal connection with the plate $n$,) and thus throw its lower end well up between the lugs $e^2$, and its holdfast-pins $i^2$ well up behind the lugs $e^2$, to insure the locking together of the lower end of said tie-rod and the lugs $e^2$ of the former. This having been thus automatically accomplished, the cam G relieves the lever J, and the weight M operates to lift the roll I and its attachments back into the positions seen at Fig. 3, while at the same time continued circular movement of the wrist-pin of plate H operates to effect the upward or return stroke of the crank Q, thus bringing the former N and its connections back to their original positions. At the moment of the arrival back to the starting-point of all these parts the face-plate $n$ of shaft D (which has been all this time continually revolving) arrives at a position in which its cut-out $p$ will permit the passage through it of the roller device $m$, (see Fig. 5,) and the spring X (which has been all this time pulling on the bar S and holding the roll $m$ forcibly against one side of said face-plate) then instantly pulls the arm S in the proper direction and to the proper extent to effect a complete disengagement of the clutch device $i$ from its counterpart $j$. Thus the pinion F is unclutched from the driving-shaft B, and all the running parts of the machine (except said shaft and its pulley C) come to a stop automatically.

While the former-head N is turning back to its original position after the bending of the wood has been effected, the operator holds the rear or outer ends of the sticks $r$ $s$ in about a horizontal position—that is, he causes them to recede from the machine in about a horizontal line of travel or path of movement. This brings the forward ends of said sticks (after their bending and the stoppage of the former N) into about the same relative position with the part O of the former-head as that they would occupy were the sticks unbended and their back ends raised up into a position nearly vertical over the part O of the head N, and hence either at the time of or before the final stoppage of the head the operator can with perfect facility remove the bended sticks, together with the clamped-on and tied holder device that is to remain applied to their bended ends until after the setting or curing of the latter.

I have shown and described my novel machine in substantially the form and according to the details of construction and operation under which I have successfully practiced my invention for many months; but these details of structure may, of course, be varied to some extent without departing from the gist of my invention as to the several features thereof, and a machine may, of course, be made to embody less than all of said features, and thus embrace only partially, but perfectly to that extent, my invention.

What I claim as new, and desire to secure by Letters Patent, is—

1. In a machine for bending wood, a former adapted to give shape to the material and arranged to rotate back and forth about a fixed axis of oscillation, in combination with a presser-roll and means for moving the latter into contact with the stick-clamp at about the time of the commencement of the motion of the former, holding it in contact therewith during the bending operation, and then returning it to its original position, all substantially as hereinbefore set forth.

2. In a wood-bending machine having an oscillatory former and a presser-roll, I, the combination, with the mechanisms for operating said former and said presser-roll and the main driving-shaft of the machine, of an automatic clutch mechanism adapted to effect the stoppage of all the devices driven from said main driving-shaft at the moment when the former and presser-roll shall have been returned to the proper positions for the insertion of the work, as set forth.

3. A former or head, N, having two stick depressions or grooves and formed with a slot or recess, $w^2$, (for the accommodation of the tie-rod of a stick-clamping device,) located intermediate of said grooves, all substantially as shown and described.

4. In combination with the recessed former, adapted to shape a series of sticks or blanks at one operation, a spring pusher device or piston arranged and operating to effect the interlocking of the tie-rod $w$ with the holding-lugs $e^2$ of the stick-clamp during the bending operation, as set forth.

Witness my hand this 18th day of July, 1881.

GEORGE C. AVERY.

In presence of—
 N. R. WILSON,
 JOHN KELSALL.